March 22, 1927.
S. W. BRIGGS
TRACTOR SCOOP
Filed Jan. 19, 1926
1,622,083
4 Sheets-Sheet 1
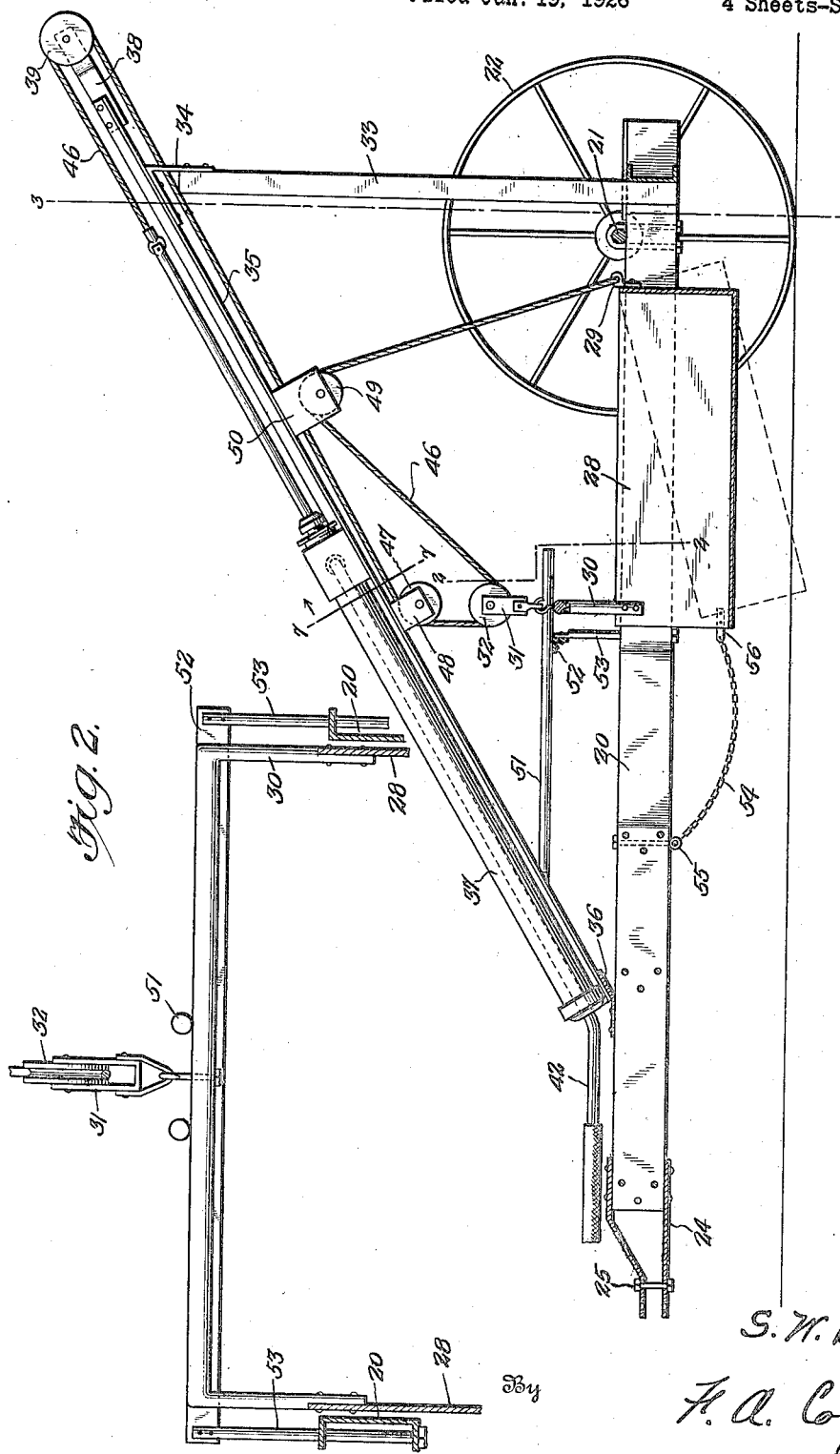

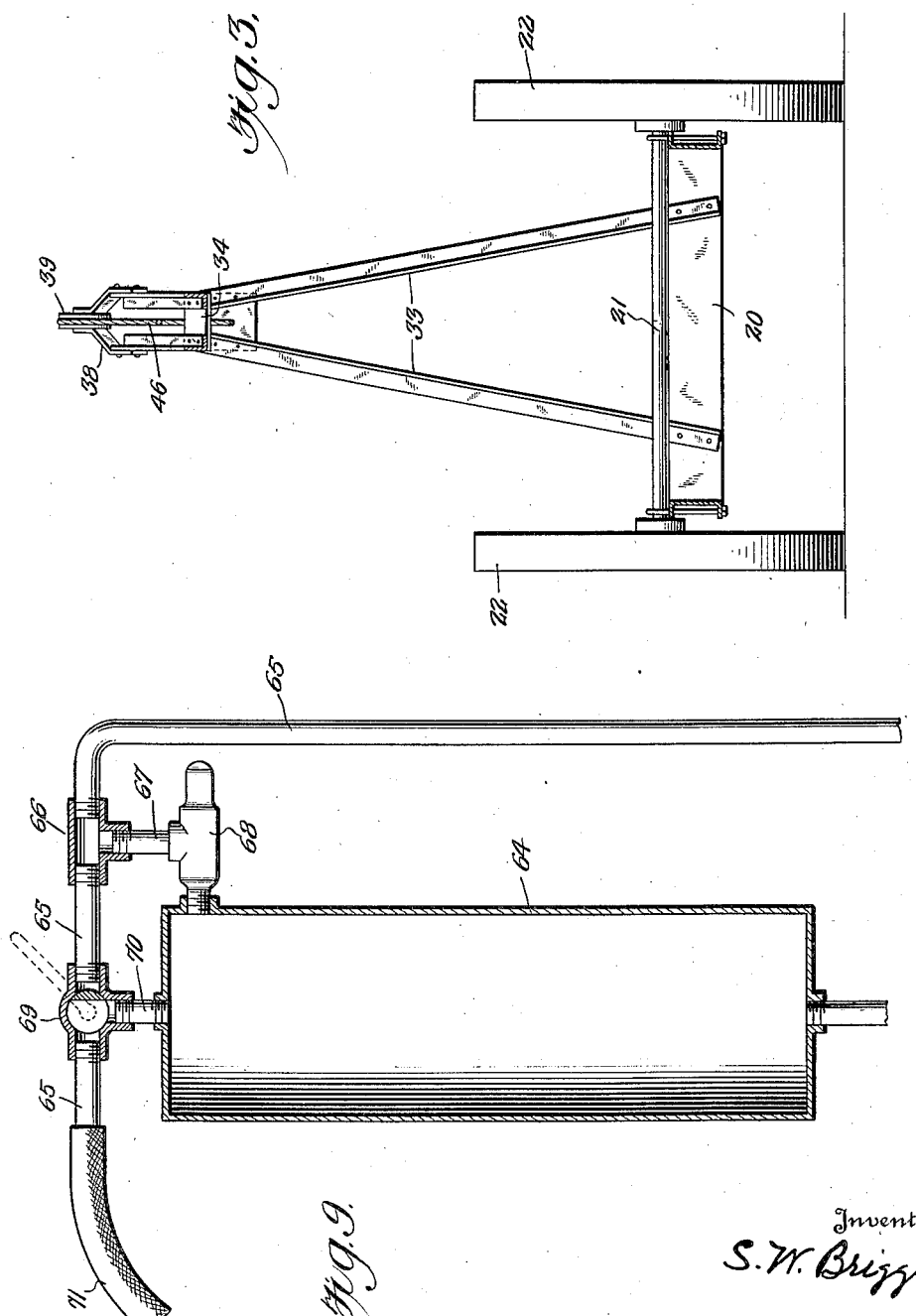

March 22, 1927.
S. W. BRIGGS
1,622,083
TRACTOR SCOOP
Filed Jan. 19, 1926    4 Sheets-Sheet 3
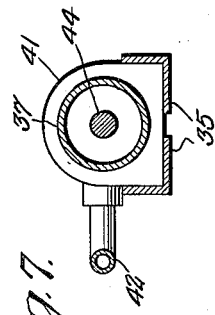
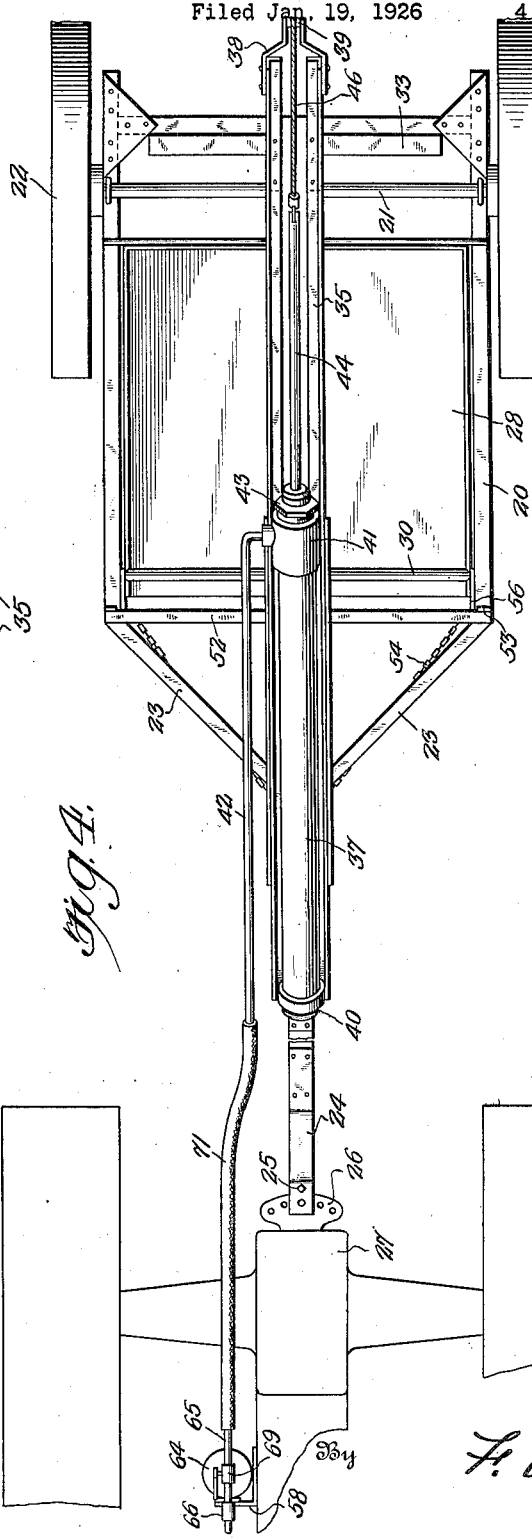
Inventor
S. W. Briggs
By F. A. Colford,
Attorney

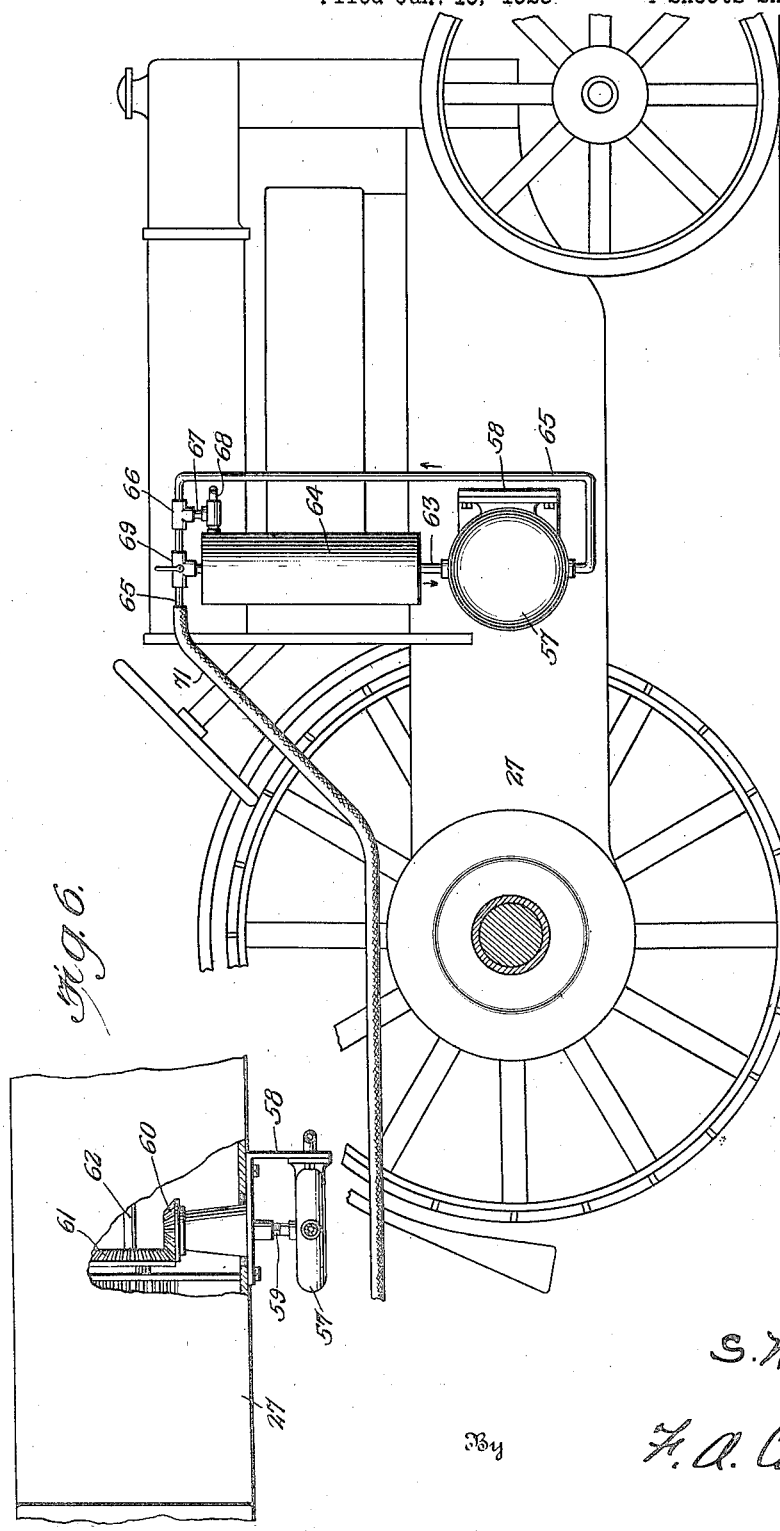

Patented Mar. 22, 1927.

1,622,083

UNITED STATES PATENT OFFICE.

SOUTHWICK W. BRIGGS, OF GLENMONT, MARYLAND.

TRACTOR SCOOP.

Application filed January 19, 1926. Serial No. 82,330.

The present invention relates to tractor scoops, and more particularly to that type wherein the scraper pan is operated and controlled by fluid pressure.

An object of the present invention is to provide a construction wherein a single cylinder is employed for operating the pan not only to fill the same, but also to raise and carry the load and further to operate the pan for dumping the load.

Another object of the invention is to provide an improved construction of relatively simple form wherein a single flexible connector is utilized between the cylinder means and the pan and connected between the same in such manner as to effect the various desired raising and lowering of the opposite ends of the pan for filling, carrying and dumping the same.

A further object of the invention is to provide an improved control for regulating the introduction and withdrawal of the fluid from the cylinder, and which is actuated from a tractor.

The invention still further aims at the provision of an improved fluid circuit capable of mounting upon a tractor and connected to the usual mechanism of the tractor, so as to maintain a constant fluid current at all times in condition for use in actuating the cylinder and which may be maintained in circulation when the cylinder is released or is not in operation without disturbing the function between the fluid current device and the tractor.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a tractor scoop constructed according to the present invention.

Figure 2 is a fragmentary enlarged section taken on the line 2—2 of Figure 1 and showing the forward scoop pan connection and the stop means for limiting the upward movement thereof.

Figure 3 is a transverse section through the rear end of the tractor scoop taken on the line 3—3 of Figure 1.

Figure 4 is a top plan view of the tractor scoop as connected to a tractor and showing the fluid circuit means connected to the tractor.

Figure 5 is an enlarged side elevation of the fluid circuit means as applied to a tractor.

Figure 6 is a fragmentary top plan view of the pump connection between the fluid circuit means and the tractor.

Figure 7 is a detail enlarged transverse section taken through the upper end of the fluid cylinder of the tractor scoop, on the line 7—7 of Figure 1.

Figure 8 is a detail enlarged longitudinal section taken through the fluid cylinder, and Figure 9 is a detail enlarged sectional view of the fluid reservoir and adjacent connections for the fluid circuit means.

Referring to the drawings, 20 designates a frame of any suitable construction open intermediate its ends and across which is secured a rear axle 21 upon which ground wheels 22 are mounted to support the rear end of the frame. The forward end of the frame is provided with converging bars 23 supporting a clevis 24 carrying a bolt or pin 25 for detachable engagement with the coupling head 26 carried upon the rear end of a tractor 27.

Arranged within the opening of the frame 20 is a scraper pan 28 open at its forward end and closed at its rear end and provided across its rear upper edge portion with a supporting rod 29 projecting beyond the opposite sides of the scraper pan 28 and adapted to bear across the upper edges of the sides of the frame 20. The rear end of the scraper pan 28 therefore cannot drop through the frame 20. The forward end of the scraper pan 28 is provided with an upwardly extending bail or yoke 30, which carries a pulley bracket 31 in which a pulley 32 is mounted for raising and lowering the forward end of the scraper pan 28.

A pair of upwardly converging frame bars 33 is carried upon the rear end of the frame 20 and the bars 33 are connected at their upper ends by a bracket plate 34 with an upwardly and rearwardly inclined support 35 of any suitable construction, but preferably comprising a pair of spaced angle bars with their flanges extending upwardly to provide a support and guide connected to the forward end of the frame 20 at its lower end by a plate 36. The support 35 carries an elongated fluid cylinder 37 in its lower end portion while the support 35 is provided with a pulley bracket 38 upon its upper end in which is mounted a pulley 39. As shown in Figure 8 the cylinder 37 is closed at its lower end by a cap 40 and at its upper end is provided with a coupling head 41 into one side of which is connected a fluid supply pipe 42. The outer end of the coupling head 41 carries a stuffing box 43 through which slides a piston rod 44 connected to a piston 45 operable in the cylinder 37. Fluid is adapted to enter and leave the cylinder 37 through the pipe 42.

The piston rod 44 extends lengthwise from the cylinder 37 in the combined support and guide 35 and is connected at its outer end to a cable 46 or other suitable flexible means which is carried rearwardly and upwardly and over the pulley 39. The cable 46 extends downwardly and forwardly from the pulley 39 to a pulley 47 mounted in a bracket 48 secured to the support 35 immediately over the forward end of the scraper pan 28, the cable 46 passing downwardly from the pulley 47 and about the pulley 32, whence the cable 46 is carried upwardly to a pulley 49 mounted in a bracket 50 depending from the support 35 toward the rear end thereof. The cable 46 is carried downwardly from the pulley 49 to the rear end of the scraper pan 28 and is connected to the rod 29 thereof, or through any other suitable means.

Stop means 51, at present in the form of a pair of substantially horizontal rods, is secured at its forward end to the support 35 near the lower end of the cylinder 37 and extends rearwardly to over-lie the bail or yoke 30 of the scraper pan 28, a cross bar 52 connecting the rear end portions of the stop bars 51 and connected by arms 53 to the adjacent side portions of the frame 20. The bail 30 is adapted to strike the stop 51 to limit the upward movement of the scraper pan 28 after the latter has been raised at its forward end into a substantially horizontal position to support the load which is taken up by the scraper pan. The stop 51 also serves as a means for holding the forward end of the pan from moving upwardly while the rear end of the pan is elevated for the purpose of dumping the pan when desired. A chain 54 may be connected by means of a bolt 55 to the forward end of the frame 20 and extends to the forward end of the pan 28 the chain 54 being branched or divided for this purpose and secured to the ears 56.

The means for controlling the cylinder 37 comprises a fluid pump 57 mounted on a bracket plate 58 detachably secured to the side of the tractor 26. The pump has a shaft 59 upon which a bevel pinion 60 is mounted which meshes with a pinion gear 61 carried in the usual manner upon the power shaft 62 of the tractor, as shown in detail in Figure 6.

The pump 57 is connected at its inlet end by a pipe 63 with a reservoir or tank 64 adapted to contain a fluid, such as an oil or the like, and the outlet lower end of the pump 57 is connected to a pipe 65 which extends upwardly to the top of the tank 64 and is returned across the upper end of the tank and provided with a T-coupling 66 from which leads a branch pipe 67 connected to an automatic pressure controlled valve 68 of any approved type which in turn is connected to the upper end of the tank 64. The pipe 65 is provided, beyond the T-coupling 66, with a three-way valve 69 having a nipple 70 on one branch thereof which is connected to the top of the tank 64 while its other branch carries a continuation of the pipe 65 to which is connected a flexible hose 71 of sufficient length to extend from the tractor 27 to the lower end of the fluid supply pipe 42. The pipe 42 is carried downwardly at one side of the cylinder 37 to the forward end of the frame 20 near the clevis 24, the flexible pipe 71 permitting the free movements between the tractor and the scoop.

In operation, the pump 57 is driven by the tractor motor and draws fluid downwardly from the tank 64 and forces the fluid upwardly through the pipe 65. When the three-way valve 69 is closed to the inner end of the pipe 65, as shown in Figure 9, the fluid forced upwardly through the pipe 65 enters the branch pipe 67 and forces the valve 68 open to permit the fluid to pass back into the tank 64.

When, however, the valve 69 is adjusted to provide a through passage in the pipe 65 through the valve 69, the fluid is forced into the flexible pipe 71 and into the supply pipe 42 through which the fluid flows into the top of the cylinder 37. The piston 45 is thus forced downwardly in the cylinder and the cable 46 is drawn therewith to first lift the forward end of the scraper pan 28 until the yoke or bail 30 strikes the stop 51, at which time the draft of the cable 46 is transmitted through the pulley 32 to the rear end of the scraper pan elevating the same.

As the pulley 32 provides a reduction gearing in the draft line, the forward end of the pan will be elevated without disturbing the position of the rear end of the pan because the latter requires a direct pull, while the forward end of the pan rises at one-half the speed of the road of travel of the cable 46 and consequently offers considerably less resistance to elevation as compared with the rear end of the pan. When the cable 46 is thus pulled, the forward end of the pan will first be operated and will continue to rise until the stop 51 is brought into operation.

When it is desired to scrape up a load, the valve 69 is adjusted into the position shown in Figure 9 wherein the fluid in the cylinder 37 travels backwardly through the flexible hose 71 and into the top of the tank 64. At this time the rear end of the scraper pan 28 is seated on the frame 20 and then the forward end of the scraper pan is permitted to swing down for contact with the ground, or below it as occasion may require to scrape up a load. As soon as the desired load has been placed in the scraper pan 28, fluid is admitted to the cylinder to first elevate the forward end of the pan. The outer end of the pipe 65 may now be closed by swinging the valve 69 into a position opposite to that shown in Figure 9, so as to hold the load in the pan and maintain the pan in the carrying position shown in Figure 1.

To dump the pan the valve 69 is adjusted to admit more fluid to the cylinder 37, so that the cable 46 will be further drawn and the rear end of the pan 28 will then be elevated above the frame 20 sufficiently to dump the load. During this time the forward end of the pan is held upwardly in a position defined by the stop 51.

It is obvious that various changes and modifications may be made in the details of construction and design of the above specifically described embodiment of this invention without departing from the spirit thereof, such changes and modifications being restricted only by the scope of the following claims.

What is claimed is:—

1. In a tractor scoop, a pan, and a single hydraulic means connected to the opposite ends of the pan for independently raising and lowering the opposite ends of the pan for filling and dumping the same.

2. In a tractor scoop, a frame for attachment to a tractor, a scraper pan mounted in the frame, a single fluid operated cylinder mounted on the frame, and a single flexible element connected between the opposite ends of the pan and said fluid operated element for independently raising and lowering the opposite ends of the pan to fill and dump the same.

3. In a tractor scoop, a frame for attachment to the tractor, a scraper pan suspended in the frame, a single fluid operated means mounted on the frame, a flexible connector connected at one end to said fluid operated means and at its other end, to the rear end of said scraper pan, and a speed reduction connection between an intermediate portion of said cable and the forward end of said scraper pan to raise and lower the opposite ends of the pan at different rates of speed.

4. In a tractor scoop, a frame, a single fluid operated cylinder on the frame, a scraper pan suspended in the frame, a flexible connector between the cylinder and the rear end of the scrapper pan, a speed reduction connection between the forward end of the scraper pan and an intermediate portion of said flexible connector, and a stop carried by the frame for arresting the lifting of the forward end of the scraper pan beyond a predetermined height.

5. In a tractor scoop, a frame, a single cylinder on the frame, a scraper pan suspended in the frame, a flexible connector attached at one end to the cylinder and at its other end to the scraper pan, a speed reduction connection between the scraper pan and the intermediate portion of the flexible connector, and stop means on the frame to arrest the upward movement of one end of the scraper pan beyond a predetermined height.

6. In a tractor scoop, a frame, a scraper pan in the frame, a single cylinder mounted on the frame and connected to the scrapper pan for operating the same, a fluid circuit means adapted to be mounted on the tractor, and valve means on the tractor adjacent the fluid circuit means and cooperable with the fluid circuit means and with said cylinder for deflecting fluid from the circuit means into the cylinder for operating the latter.

In testimony whereof I affix my signature.

SOUTHWICK W. BRIGGS.